S. S. RANKIN.
WHEEL.
APPLICATION FILED SEPT. 16, 1916.
1,244,128.
Patented Oct. 23, 1917.
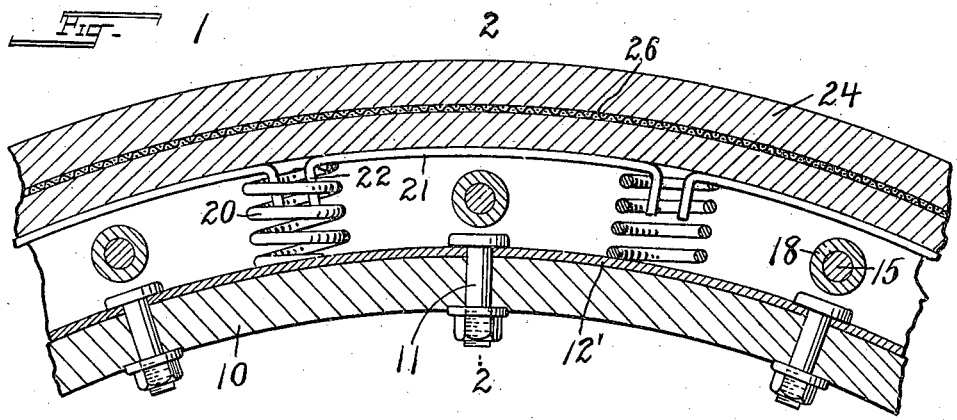
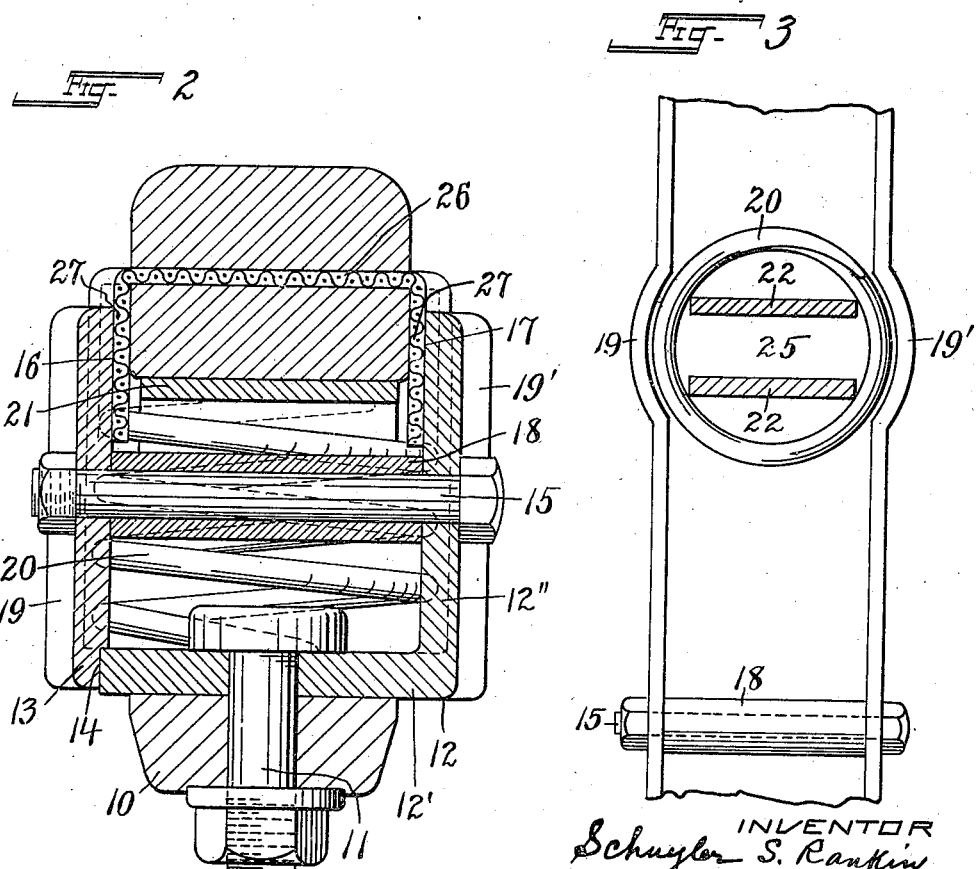
INVENTOR
Schuyler S. Rankin
BY
Dyke & Camfield, his
ATTORNEYS

UNITED STATES PATENT OFFICE.

SCHUYLER S. RANKIN, OF NEWARK, NEW JERSEY.

WHEEL.

1,244,128.  Specification of Letters Patent.  Patented Oct. 23, 1917.

Application filed September 16, 1916. Serial No. 120,482.

*To all whom it may concern:*

Be it known that I, SCHUYLER S. RANKIN, a citizen of the United States, and a resident of Newark, county of Essex, and State of New Jersey, have invented certain new and useful Improvements in Wheels, of which the following is a specification.

My invention relates to wheels, and particularly to that type of wheels in which resiliency is imparted to the tire by the use of springs. With a wheel in accordance with my invention spring means are interposed between the felly and the tire, which is preferably solid and of rubber or similar material, and the resiliency is obtained by the combined resilient action of the tire itself and the added resiliency afforded by the spring means interposed between the solid tire and the felly.

One feature of the present invention consists in the provision of a special rim provided with means for keeping the resilient spring backing members of the tire in proper and correct position at all times.

Another feature of the invention consists in the combination of coil springs and flat or leaf springs for affording a substantially continuous spring backing for the tire.

Another feature of the invention consists in the provision of a tire with side aprons of fabric or similar material which extend within the rim and serve to exclude dust and dirt from the interior of the rim and which afford a convenient means for carrying a lubricant, as graphite, which may serve to lubricate the walls of the rim and permit the tire to work freely in and out between such side walls between which it is received.

Other features of the invention will be referred to in connection with the following description, and with the foregoing and related objects in view, my invention consists in the parts, improvements and combinations herein set forth and claimed.

In order that my invention may be clearly understood I have illustrated in the accompanying drawing one form of structure in which it may be embodied. In said drawing, in which the same reference characters are applied uniformly to designate the same parts throughout, Figure 1 is a longitudinal sectional view of a wheel felly equipped with a rim and tire in accordance with my invention. Fig. 2 is a transverse cross-sectional view partly in elevation, the cross-sectional portion thereof being taken on the line 2—2, Fig. 1. Fig. 3 is a fragmentary plan view of the wheel rim and spring backing for the tire, with the tire removed and the legs of the leaf spring members being shown in cross-section.

The felly 10 of the wheel may be of any ordinary construction and my improved rim is secured thereto in any convenient manner, as by bolts 11. The rim is of such form as to provide a substantially straight-sided channel between the walls thereof and may consist of two parts 12 and 13, the part 12 being made up of a base ring 12' and a side flange or plate 12" which may be formed integrally with one another if desired, and the member 13 forming with the wall or flange 12" a substantially straight-sided channel between them. The part 13 may be notched out or rabbeted as shown at 14 in order to assure correct relation of the parts when fastened together. The plate 13 may be fastened to the member 12 by any convenient means, as, for instance, by bolts 15, and means are provided in the neighborhood of the bolts for keeping the inner walls 16 and 17 of the rim channel at the same distance apart. In the form shown such means consist of sleeves 18 encircling the bolts 15 and keeping the inner walls 16 and 17 of the rim channel in proper spaced relation. At suitable intervals the side flanges 12" and 13 of the rim are provided with lateral extensions 19 and 19', preferably arcuate in form, and between such lateral extensions the compression springs 20 are inserted within the channel provided within the rim. The outside diameter of the springs 20 is greater than the width between the principal side walls 16 and 17 so that, as will be observed, the position of such springs within the rim channel is substantially fixed by the bulge in the side walls between which they are received, and while they are free to move up and down, they cannot move out of position in a peripheral direction. Between the compression springs 20 flat or leaf springs 21 are provided, and the same preferably have a continuous arcuate form as shown so as to correspond substantially to the curvature of the wheel, and they are provided with downwardly extending legs 22, 22, which are inserted and received within the opening within the spring 20, as is clearly shown in Figs. 1 and 3. As the coil springs 20 are retained in fixed positions within the sockets provided for them, and the leaf springs 21 have their legs received within the openings in the coil springs, the entire spring backing for the tire is maintained in substantially permanent position, that is to say, it is impossible for the parts making up the spring backing to travel peripherally about the rim or to move to any substantial extent in such peripheral direction.

The tire 24, which is preferably what is known as a solid tire and may be of any ordinary or well-known construction, is received between the walls 16 and 17 of the rim and encircles the spring backing members 20 and 21. In applying the tire to the spring backing the spring members are preferably compressed to a substantial extent and the tire 24 placed thereon so that when the tire is ready to be used all the parts thereof are under tension. The legs 22, 22 of the leaf springs 21 preferably have a space 25 between them so that they may have such slight movement toward and away from one another, as may be necessary when the tire is under load, to prevent them from making contact with one another or binding in any way.

It will be seen that a structure such as described provides a substantially continuous and non-shiftable spring backing for the tire, the resiliency whereof is due partly to the coil compression springs and partly to the interposed leaf springs, and that a substantially increased amount of resiliency may be imparted by such construction to the tire beyond what is ordinarily obtainable with solid tires.

While I may use any form of solid tire, I preferably make use of that form illustrated in the drawing in which the strip or strips of fabric or like material 26, preferably extending through the tire at the center thereof, are provided, and which extend, as indicated at 27, some distance beyond the tire on either side thereof. When a tire so formed is made use of in connection with my improved rim and spring backing, the aprons 27, which are flexible, are received between the tire and the side walls 16 and 17 of the rim and serve to exclude dirt and foreign matters from getting into the channel and behind the tire, and furthermore, by supplying graphite or similar preferably dry lubricant to the aprons 27 and impregnating the same therewith, the slight movement of the tire in and out of the channel is effectively lubricated and undue friction and heating avoided. The aprons 27 may be constructed in various other ways than as shown.

It will be seen that a tire and rim constructed in accordance with the invention can be made very readily and cheaply, that it will stand up under severe usage, that all the parts, being put together under tension, are snug and taut so that there is no shake or rattle, and that various other advantages are obtained.

While I have shown and described a particular form in which my invention may be embodied, it is to be understood that I am not to be confined thereto, but that numerous changes in and departures from the particular structure shown may be resorted to within the scope of my claims without departing from my invention or sacrificing any of its advantages.

Having thus described my invention, I claim:

1. In a wheel, a rim of substantially channel form with its side walls projecting laterally at intervals, coil springs between the said walls at the regions of said lateral projection of the side walls, leaf springs having their ends received within the coil springs and forming a substantially continuous spring surface, and a tire on the spring surface so formed.

2. In a wheel, a rim of substantially channel form with its opposite side walls laterally bulged at intervals, coil springs between the side walls at said bulged regions, said springs being of an exterior diameter greater than the distance between the principal side walls of the channel, leaf springs having their ends received within the coil springs and forming a substantially continuous spring surface, and a tire on the spring surface so formed and projecting from and received partly within said rim.

3. In a wheel, a rim of substantially channel form, a tire received partly within and partly without said rim, the sides of the tire and the rim being substantially parallel, the tire being provided with laterally extending flexible aprons, and said aprons extending into and substantially filling the spaces alongside the tire and between it and the rim.

In testimony that I claim the foregoing, I have hereto set my hand, this 14th day of September, 1916.

SCHUYLER S. RANKIN.

Copies of this patent may be obtained for five cents each, by addressing the "Commissioner of Patents, Washington, D. C."